(No Model.)  
J. S. & A. S. BAKER.  
WINDMILL.  
No. 494,238.
2 Sheets—Sheet 1.
Patented Mar. 28, 1893.
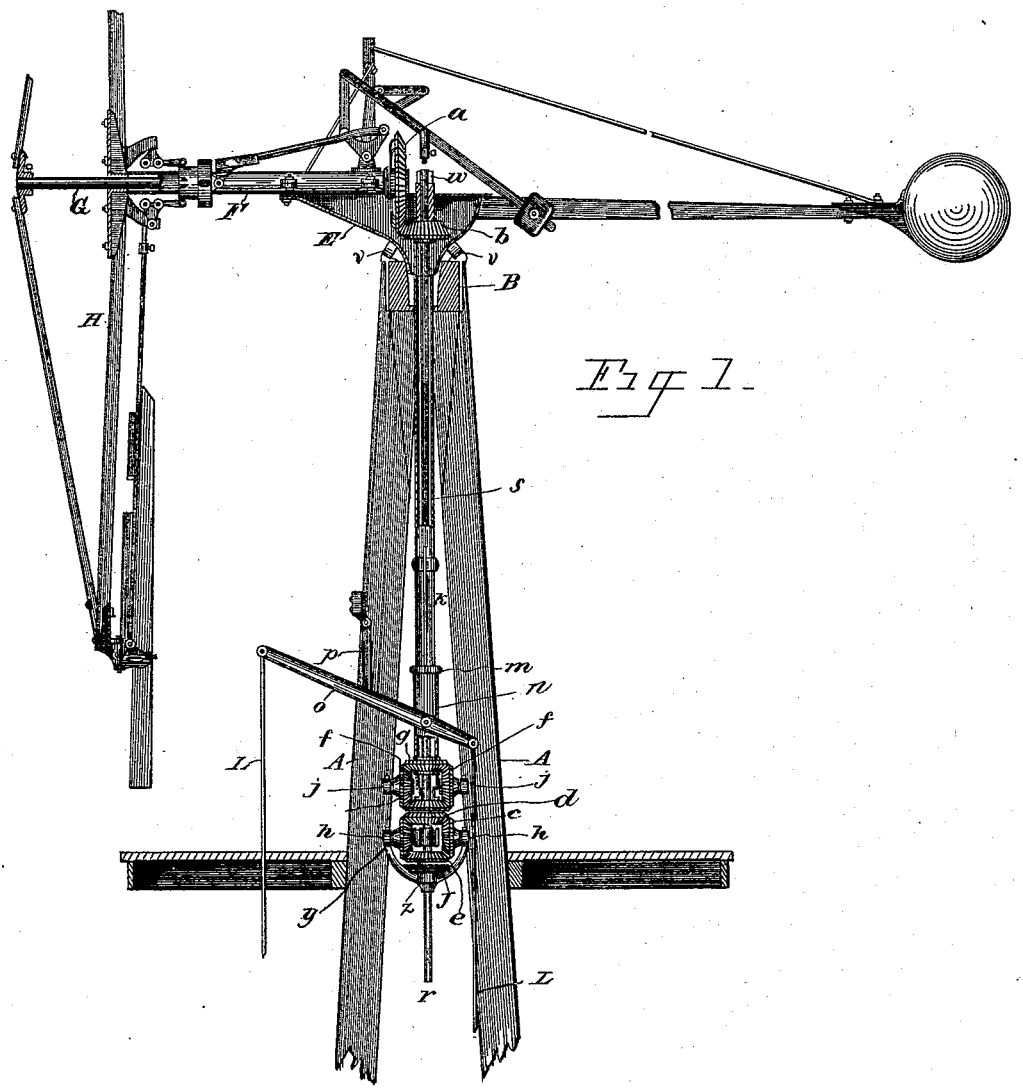
WITNESSES
INVENTORS:  
John S. Baker and  
Allen S. Baker by  
Frank L. Dyer Attorney

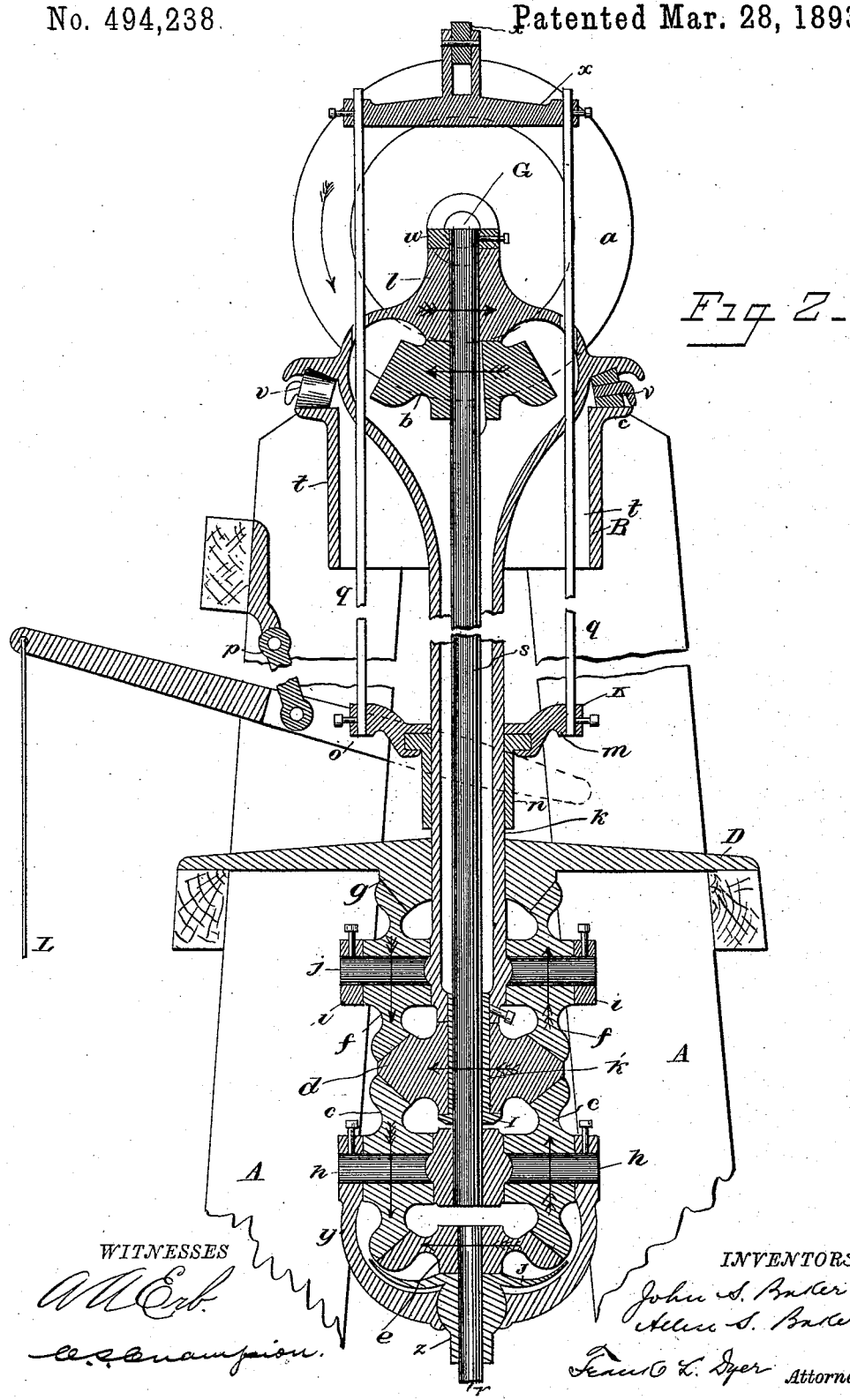

UNITED STATES PATENT OFFICE.

JOHN S. BAKER AND ALLEN S. BAKER, OF EVANSVILLE, WISCONSIN.

WINDMILL.

SPECIFICATION forming part of Letters Patent No. 494,238, dated March 28, 1893.

Application filed March 3, 1891. Serial No. 383,617. (No model.)

*To all whom it may concern:*

Be it known that we, JOHN S. BAKER and ALLEN S. BAKER, citizens of the United States, residing at Evansville, in the county of Rock and State of Wisconsin, have invented certain new and useful Improvements in Windmills; and we do hereby declare the following to be a full, clear, and exact description of the invention, which will enable others skilled in the art to which it appertains to make and use the same.

Our present invention relates to various new and useful improvements in windmills and balanced and swiveled gearing therefor, whereby the tendency of the windwheel to be carried out of the wind, by the reaction of the driven machinery, is done away with, and whereby the turntable may be easily moved by the wind in either direction around the tower, without affecting the speed of the windwheel, or the driven machinery.

For a better comprehension of the invention, attention is directed to the accompanying drawings, forming a part of this specification, and in which Figure 1, is an elevation partly in section, of our improved mill, and Fig. 2, an enlarged sectional view of our improved gearing.

In each of the above views, corresponding parts of the device are designated by identical letters of reference.

A, A, are the posts of the usual wind-mill tower, and B, is the top casing thereof, which is rigidly secured to the top of the tower. The casing B, is provided with a circular track C, at its upper end, and this track supports the usual friction rollers, $v, v$. The friction rollers, $v, v$, carry the ordinary turntable $l$, which is made of metal in the hollow form shown, and which is provided with a downwardly extending portion $k$. This cylindrical portion $k$, bears within a plate D, which is rigidly secured to the tower, so that by this means the turn table will be held always in a vertical position.

The turn table at one side, is provided with a bracket portion E, which supports a bearing sleeve F. The sleeve F carries a windmill shaft G, and at the outer end of the wind-wheel shaft is placed the wind wheel H, of any suitable and appropriate construction. The wind wheel proper, does not relate to the main spirit of the invention and a detailed description of the same is therefore unnecessary. On the inner end of the wind wheel shaft is mounted a bevel gear $a$, which engages with the pinion $b$, which is keyed to the shaft $s$, within the upper portion of the turntable. To prevent the shaft $s$, from falling a collar $w$, is secured at its upper end, and bears on the top of the turn table. The shaft $s$, has a bearing at each end, the lower one being within the sleeve $k'$, which is secured to the lower end of the elongated portion K, of the turntable. The sleeve $k'$, is preferably made of some hard metal, such as gun metal, so that there will be but little wear on the same.

The double trunnions $h, h$, are keyed to the lower end of the shaft $s$, and on each trunnion is mounted a bevel wheel $c$. The upper portion of the double wheel $c, c$, engages with the lower portion of the double bevel-wheel $d$, this bevel wheel being mounted upon the sleeve $k'$, and supported by the flange I, situated at the lower end of the sleeve $k'$.

The cylindrical portion K, of the turn table is provided at its lower end with trunnions $j, j$, which carry bevel wheels, $f, f$, said wheels being adapted to engage at their lower portions with the upper face of the double bevel wheel $d$. The bevel wheels $f, f$, also engage at their upper portion with the bevel wheel $g$, integral with, or secured to the plate D before referred to. The bevel wheels $c, c$, engage at their lower portions with the bevel wheel $e$, which is keyed to the upper end of the vertical shaft $r$, and this shaft connects with the machinery that is to be driven. The trunnions $h, h$, also carry a yoke $y$, which extends downwardly and which holds by means of a ball-and-socket joint the bearing $z$, within which the shaft $r$ rotates. The bearing $z$, is provided at its upper portion with a saucer shaped extension J, which catches oil dripping from the gear and lubricates the bearing $z$.

When the turntable is stationary the operation of the gearing is as follows: The wind wheel will turn the bevel gear $a$, in the direction of the arrow thereon, and this will rotate the pinion $b$, and the shaft $s$, in the direction of the arrow shown on the pinion. The trunnions $h, h$, will be carried in the same direction. This will cause the bevel gears *c, c,* to track around on the under face of the double gear *d,* which is stationary, since the turntable is supposed to be stationary; and these bevel wheels *c, c,* will also turn on the trunnions in the direction of the arrows thereon. The gear *e,* will therefore be operated not only by the motion derived by its revolving around the shaft, of the gears *c, c,* but also by their rotation on the trunnions *h, h;* so that the gear *e,* will make two turns for each complete turn of the trunnions *h, h.*

In the ordinary geared mill of the type which has the wind wheel shaft G, connected by means of gear wheels *a* and *b,* to a vertical shaft, *s,* which extends to the ground, and connects with the driven machinery, the action of the wheel *a,* on the wheel *b,* produces two results. It rotates the shaft *s,* and has an equal tendency to rotate the turntable in the opposite direction. This movement on the turntable, causes the wind-wheel to assume a position more or less edgewise to the wind and thus diminishes its effectiveness. In the mill now being described this difficulty is overcome by putting another rotation on the turntable, acting through the agency of the trunnions *j, j,* equaling the first movement but acting in the opposite direction. These two movements balance or neutralize each other. The movement through the trunnions *j, j,* is produced in this manner:—the wheels *c, c,* produce a movement, on the double faced gear *d,* and as this gear is loosely mounted on the sleeve *k′,* it tends to turn the wheel *f, f,* on the trunnion *j, j,* and to make them track around on the under face of the wheel *g.* This tendency produces a movement of the trunnions *j, j,* which in respect to magnitude and direction, is equal to balance the mill; that is, it is twice as great as the movement in the wheel *d,* and equals the movement in the shaft *s.* This movement acts in the same direction as the movement of the wheel *d* and the shaft *s,* and in the opposite direction to the movement of the turntable made by the action of the wheel *a,* on the pinion *b.*

It is to be noticed that the above explanation of the balancing of the mill holds true whether the turn table is at rest or turning in either direction in the tower.

To clearly illustrate the fact that the shifting of the turntable with the continually varying direction of the wind has no effect either on the speed of the wind wheel or on the driven machinery, let it be supposed that the gear *a,* is turning in the direction of the arrows, shown thereon. Now if the lower portion of the turn table is stationary and the upper portion is turned in the direction of the shaft *s,* the speed of the wheel is accelerated by an amount equal to twice the speed of the upper portion. If the lower portion of the turntable rotates in the direction of the shaft *s,* and the upper portion be stationary, the speed of the wheel *e,* will be retarded by an amount equal to twice the speed of the lower portion. Now if the upper and lower portions of the turn table be turned in unison, the speed of the wheel *e,* will at the same be accelerated and retarded to the same extent, which in no way affects its speed. By similar reasoning it will be seen that the speed of the shaft *r,* is double the speed of the shaft *s,* whether the turntable be stationary or turning in either direction with constant or varying speed.

In practice there is this reason for making the two sets of gears *f, f,* and *c, c,* equal in size, there being practically no wear on the gears *f, f,* and the upper face of the gears *d,* and also when the wheels *c, c,* and under face of wheel *d,* have become worn, the two sets of the gears *f, f,* and *c, c,* may be interchanged and the double faced gear turned over. It is not necessary however that the wheels *f, f,* and *c, c,* be of equal size. If the wheels *f, f, c, c, g,* and *e,* be made with two faces and the gear *d* with four faces, it will be possible to construct a swivel gear of our improved type, having no two faces with an equal number of teeth, nor any two of the four trunnions making the same angle with the vertical shaft. Square gearing may be also used and the trunnions can be placed in a vertical position.

By the use of the double trunnions *j j,* and *h, h,* and the twin gears *f, f,* and *c, c,* instead of single trunnions and single gear the elongated position of the turn table K is balanced in its bearings in the plate D, the double gear *d,* on its bearing *k′,* the shaft *s,* in its bearing *k′,* and the shaft *r,* in its bearing J, hence most of the friction of these parts is eliminated and the tendency for the shafts *r,* and *s,* to wear out of line avoided. By hanging the bearing *z,* by means of the yoke *y,* from the trunnions *h, h,* which rotate one half as fast as the shaft *r,* the friction in the bearing *z,* is again reduced by one half. By supporting the gear *d,* by the flange I, instead of the hub of the trunnions *h, h,* or by means of a collar on the shaft *s,* the tendency for this gear to mesh deeper and deeper with the gears *c, c,* due to the wearing off of its hub by the rotation of its shaft *s,* is avoided.

The mechanism for controlling the wind wheel will now be described. A lever *o,* is pivoted in the tower by means of the link *p,* and is bifurcated at its inner end. The two arms of the bifurcated portion of this lever engage with the sleeve *n,* which is flanged at its upper portion and which surrounds the cylindrical portion K, of the turn-table, engaging with the flange portion of the sleeve *n,* having integral ears K, at each side. Secured within each ear K are the vertical rods *q, q,* extending up through the head of the turntable. The rods *q, q,* are connected above the turntable by the yoke *x,* which has set screws engaging with the said rod so that the relative position of the connection, yoke and collar K, may be adjusted as described, the connection beyond the yoke *x,* is of suitable design and need not be described here. The lever o, is rocked by means of the wires or chains L, L, secured at its end and leading to the ground. It carries with it the sleeve n, the collar m, the rods q, q, yoke x, and other connections and thus the wind wheel may be controlled as desired. The sleeve n, and collar m, constitute a swiveling joint, so that the collar n, will be allowed to rotate with the turntable. By constructing the turntable with the cylindrical portion K, sufficiently long to permit the sleeve n, to have the necessary sliding motion between the turntable head and the plate D, and by the use of the controlling mechanism just described a simple means of controlling the wind wheel is obtained. We describe this method of controlling the wind wheel merely for the purpose of illustration, and do not limit ourselves in any way to the same. Neither do we make claim to the same.

The usual vane for directing the wind-wheel into the path of the wind is not shown in the drawings, but it is to be understood that it is of the usual construction.

Having described our invention, what we claim as new therein, and desire to secure by Letters Patent, is as follows:

1. In a windmill, the combination of a windmill tower; a turntable adapted to rotate freely thereon, and having a downwardly extending cylindrical portion k, sufficiently long to carry the sleeve n, and permit it to have the necessary vertical motion; a wind-wheel shaft journaled in the turntable; a wind-wheel at the end of said wind-wheel-shaft; a vertical shaft journaled within the turn-table; and operated by the wind-wheel-shaft; a second vertical shaft within the tower and connecting with the driven machinery, and gearing connecting the vertical shafts together and reacting on the turn-table, substantially as described.

2. In a wind-mill, the combination of the wind-mill tower, a turntable adapted to rotate freely thereon a wind wheel shaft journaled in said turntable and carrying a wind wheel at its outer end; the shaft s, journaled in the turntable, and carrying double trunnions h, h, at its lower end; two bevel wheels c, c, on said double trunnions engaging with the loosely mounted double gear d, and with the gearing e, secured to the shaft r, which connects with the driven machinery; double trunnions j, j, on the turntable, carrying two bevel gears f, f, which also engage with said loosely mounted double gear d, and with the stationary bevel gear g, on the tower; substantially as described.

3. In a wind-mill of the character described, the combination of the wind-mill-tower; a turntable adapted to rotate on said tower, a wind-wheel-shaft journaled in said turntable; and carrying a wind wheel at its outer end; a gear wheel a, secured to said wind wheel shaft and engaging with the gear g, on the vertical shaft s; the double trunnions h, h, secured to said shaft s, and carrying the two bevel gear wheels c, c, the loosely mounted double gear d, with which said double gears c, c, engage; the bevel gear e, secured to the shaft r, and with which said bevel gears c, c, engage; double trunnions j, j, secured to the turn table and carrying gears f, f, which also engage with the bevel gears d, and with the stationary gear g, secured to the tower, and the movable sleeve k', upon which the double gear d bears; substantially as described.

4. In a wind mill, the combination of a tower; the turn table adapted to rotate thereon; a wind-wheel shaft journaled in said turntable and geared to the shafts; the shaft r, connected with the driven machinery; suitable gears connecting the shafts s and r, so that the shaft r, will be driven at a higher speed than s; and a yoke y, carried by the shaft s, and provided with a bearing z, for the shaft r, substantially as described.

5. In a wind mill, the combination of the tower; the turn table adapted to rotate thereon; a wind wheel shaft journaled in said turntable and geared to the shaft s, the shaft r, connected with the driven machinery; suitable gears connecting the shafts s and r, so that the shaft r, will be driven at a higher speed than s, and a yoke y, carried by the shaft s, and provided with a bearing z, having a cup shaped projection thereon, substantially as described.

JOHN S. BAKER.
ALLEN S. BAKER.

In presence of—
FRED A. BARNUM,
J. H. HOSKINS.